United States Patent [19]

Takeo

[11] Patent Number: 5,533,143
[45] Date of Patent: Jul. 2, 1996

[54] METHOD FOR DETERMINING THE ORIENTATION IN WHICH AN OBJECT WAS PLACED WHEN THE IMAGE OF THE OBJECT WAS RECORDED

[75] Inventor: Hideya Takeo, Kanagawa-ken, Japan

[73] Assignee: Fuji Photo Film Co., Ltd., Kanagawa, Japan

[21] Appl. No.: 233,980

[22] Filed: Apr. 28, 1994

[30] Foreign Application Priority Data

Apr. 27, 1993 [JP] Japan .................................. 5-100877

[51] Int. Cl.$^6$ .................................................. G06K 9/46
[52] U.S. Cl. ............................................. 382/132; 382/286
[58] Field of Search ............................. 382/1, 6, 48, 128, 382/132, 286, 288; 364/413.13; 348/94, 95

[56] References Cited

U.S. PATENT DOCUMENTS

| | | | |
|---|---|---|---|
| 4,527,060 | 7/1985 | Suzuki et al. | 250/327.2 |
| 4,860,374 | 8/1989 | Murakami et al. | 382/48 |
| 4,870,694 | 9/1989 | Takeo | 382/18 |
| 4,896,279 | 1/1990 | Yoshida | 364/559 |
| 4,903,310 | 2/1990 | Takeo et al. | 382/6 |
| 4,951,201 | 8/1990 | Takeo et al. | 364/413.13 |
| 5,042,074 | 8/1991 | Takeo et al. | 382/9 |
| 5,191,621 | 3/1993 | Brok | 382/1 |

Primary Examiner—Leo Boudreau
Assistant Examiner—Andrew W. Johns
Attorney, Agent, or Firm—Sughrue, Mion, Zinn, Macpeak & Seas

[57] ABSTRACT

An image signal, which represents an image capable of taking either a symmetric orientation or an asymmetric orientation with respect to a center line of the image serving as the axis of symmetry, is obtained. The image signal is made up of a series of image signal components representing picture elements in the image. A predetermined operation is then carried out to find the difference between values of image signal components representing at least a single pair of picture elements, which correspond symmetrically to each other with respect to the center line of the image, and to calculate a characteristic value, which represents symmetry or asymmetry of the image, from the value of the difference. A judgment is then made from the level of the characteristic value as to whether the image is a symmetric image or is an asymmetric image.

19 Claims, 3 Drawing Sheets

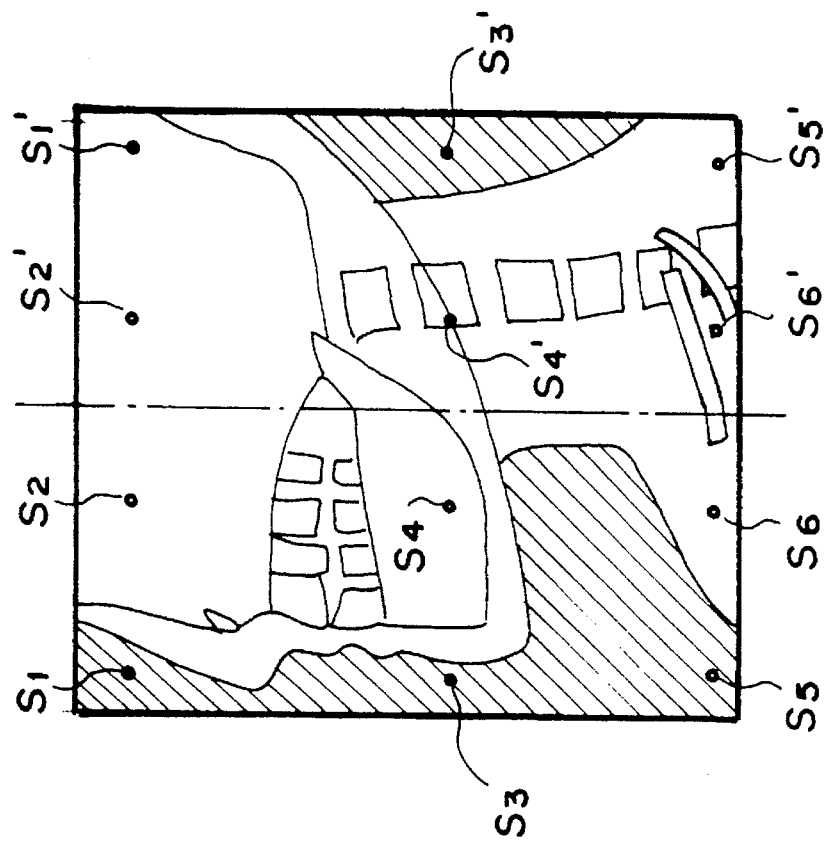
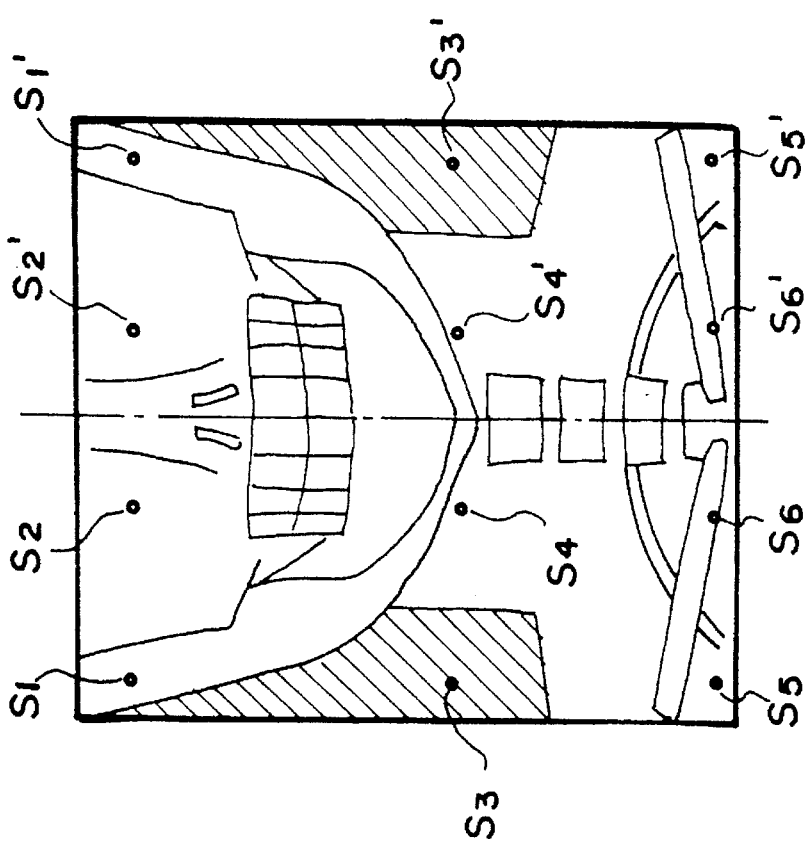

METHOD FOR DETERMINING THE ORIENTATION IN WHICH AN OBJECT WAS PLACED WHEN THE IMAGE OF THE OBJECT WAS RECORDED

BACKGROUND OF THE INVENTION

Field of the Invention

This invention relates to a method for determining an object orientation from a recorded image, wherein the orientation, in which the object was placed when the image of the object was recorded, is determined. This invention particularly relates to a method for automatically determining the orientation, in which an object was placed when an image, such as a radiation image, of the object was recorded.

Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems described above and other types of image recording and reproducing systems, in order that a visible image having good image quality can be reproduced from an image signal and used as an effective tool in, particularly, the accurate and efficient diagnosis of an illness, the state of recorded image information or an image input pattern, which is determined by what mode was used when the image was recorded (e.g., an ordinary image recording mode, a contrasted image recording mode, or an enlarged image recording mode), is often ascertained before the visible image is reproduced. Image processing, such as gradation processing, is then carried out in accordance with the contrast of the image input pattern.

As a method for ascertaining the recorded image information before a visible image is reproduced, a method disclosed in U.S. Pat. No. 4,527,060 has heretofore been known.

In cases where the conditions, under which the image processing is to be carried out, are determined with the aforesaid disclosed method, it often occurs that, when images of a single object were recorded on recording media with the object being placed in different orientations, the image density of a region of interest in the object varies for visible images reproduced from the images. For example, in cases where radiation images are recorded on recording media, it may occur that the radiation transmittance of a region of no interest, which overlaps the region of interest when the image of a single object is recorded from the front of the object, and the radiation transmittance of a region of no interest, which overlaps the region of interest when the image of the same object is recorded from the side of the object, are different from each other. In such cases, the amounts of energy stored on portions of the recording media corresponding to the region of interest during the exposure of the recording media to the radiation vary in accordance with the difference between the radiation transmittances of the two regions of no interest. Therefore, when the image signals obtained from the recording media are processed under the image processing conditions adjusted with the aforesaid disclosed method, the image density of the region of interest in the object varies for visible images reproduced from the processed image signals.

In order for the aforesaid problems to be eliminated, in cases where a radiation image stored on a stimulable phosphor sheet is read out, information concerning in what orientation the object was placed when the image of the object was recorded has heretofore been entered into an image read-out apparatus or an image processing unit each time the radiation image is read out from the stimulable phosphor sheet. Read-out conditions, under which an image signal is detected from the stimulable phosphor sheet, and/or the image processing conditions are set in accordance with the entered information concerning the orientation in which the object was placed when the image of the object was recorded. However, considerable time and labor are required to enter the information concerning the orientation, in which the object was placed when the image of the object was recorded, each time a radiation image is read out from a stimulable phosphor sheet. Also, it will easily occur that incorrect information concerning the orientation, in which the object was placed when the image of the object was recorded, is entered by mistake.

Therefore, in U.S. Pat. Nos. 4,903,310 and 4,951,201, the applicant proposed various methods capable of automatically discriminating the orientation, in which an object was placed when an image of the object was recorded on a stimulable phosphor sheet, or the like. With one of the proposed methods, a cumulative probability density function of an image signal representing an image of an object is created, and the rate of change at a predetermined part of the cumulative probability density function is calculated. Thereafter, the orientation, in which the object was placed when the image of the object was recorded, is discriminated in accordance with the value of the rate of change.

By way of example, images of objects, such as the throat and the cervical region, have the characteristics such that the frontal object image is approximately symmetric with respect to the center line of the image, and the lateral object image is asymmetric with respect to the center line of the image. As for an image capable of taking either a symmetric orientation or an asymmetric orientation in accordance with the direction from which the image of an object was recorded, higher-dimensional information should be utilized such that the reliability, with which the orientation is determined, may be kept high. Specifically, it is considered that, with a technique for determining the orientation in accordance with the symmetry or asymmetry of an image (i.e., two-dimensional information), the capability of determination of the orientation can be kept higher than the capability with the conventional technique for determining the orientation in accordance with the cumulative probability density function (i.e., one-dimensional information).

SUMMARY OF THE INVENTION

The primary object of the present invention is to provide a method for determining an object orientation from a recorded image, wherein characteristics with respect to symmetry or asymmetry of the image are utilized, and the orientation, in which the object was placed when the image of the object was recorded, is discriminated easily.

The present invention provides a method for determining an object orientation from a recorded image, wherein the orientation, in which the object was placed when the image of the object was recorded, is determined, the method comprising the steps of:

i) obtaining an image signal, which represents the image capable of taking either a symmetric orientation or an asymmetric orientation with respect to a center line of the image serving as the axis of symmetry, the image signal being made up of a series of image signal components representing picture elements in the image, ii) calculating the difference between values of image signal components representing at least a single pair of picture elements, which correspond symmetrically to each other with respect to the center line of the image, and calculating a characteristic value, which represents symmetry or asymmetry of the image, from the value of the difference by carrying out a predetermined operation, and iii) making a judgment from the level of the characteristic value as to whether the image is a symmetric image or is an asymmetric image.

By way of example, with the predetermined operation in the method for determining an object orientation from a recorded image in accordance with the present invention, the absolute value of the difference between the values of the image signal components representing each pair of the picture elements, which correspond symmetrically to each other, may be calculated. Thereafter, the total sum of the absolute values of the differences, which have been calculated for the respective pairs of the picture elements corresponding symmetrically to each other, may be calculated. Alternatively, the total sum of the square values of the differences, which have been calculated for the respective pairs of the picture elements corresponding symmetrically to each other, may be calculated. In such cases, the total sum of the absolute values of the differences or the total sum of the square values of the differences may be taken as the characteristic value, which represents symmetry or asymmetry of the image.

Also, before the predetermined operation is carried out, the values of the image signal components representing the picture elements in the image may be binarized with a predetermined threshold value. Thereafter, the predetermined operation may be carried out on the binary values which have thus been obtained.

The term "center line of an image" as used herein means the line, which is parallel to the vertical direction of the image and passes through the center point of the image.

With the method for determining an object orientation from a recorded image in accordance with the present invention, as for the image capable of taking either a symmetric orientation or an asymmetric orientation with respect to a center line of the image serving as the axis of symmetry, the characteristic value, which represents symmetry or asymmetry of the image, is calculated. A judgment is then made from the level of the characteristic value as to whether the image is a symmetric image or is an asymmetric image.

Specifically, a calculation is made to find the difference between the values of the image signal components representing at least a single pair of the picture elements, which correspond symmetrically to each other with respect to the center line of the image. In cases where the image is approximately symmetric with respect to the center line of the image, the image signal components representing the single pair of the picture elements take approximately equal values. Therefore, in such cases, the difference between the values of the image signal components representing the single pair of the picture elements takes a value approximately equal to zero. In cases where the image is asymmetric with respect to the center line of the image, the image signal components representing the single pair of the picture elements take different values. Therefore, in such cases, the difference between the values of the image signal components representing the single pair of the picture elements takes a value far apart from zero. The operation for calculating the difference is carried out for the respective pairs of the picture elements, which correspond symmetrically to each other with respect to the center line of the image. The total sum of the absolute values of the differences is then calculated and compared with a predetermined threshold value. In accordance with whether the total sum of the absolute values of the differences is or is not larger than the predetermined threshold value, a judgment can be made as to whether the image is a symmetric image or is an asymmetric image.

Alternatively, the total sum of the square values of the differences, which have been calculated for the respective pairs of the picture elements corresponding symmetrically to each other with respect to the center line of the image, may be calculated. The total sum of the square values of the differences is then compared with a predetermined threshold value. In accordance with whether the total sum of the square values of the differences is or is not larger than the predetermined threshold value, a judgment can be made as to whether the image is a symmetric image or is an asymmetric image.

Also, before the operation for calculating the differences is carried out, the values of the image signal components representing the picture elements in the image may be compared with a predetermined threshold value. The image signal components may thus be binarized in accordance with whether the values of the image signal components are or are not larger than the threshold value. Thereafter, the predetermined operation may be carried out on the binary values which have thus been obtained. In this manner, the aforesaid operation can be simplified.

As described above, with the method for determining an object orientation from a recorded image in accordance with the present invention, calculations need not be carried out for all of the image signal components representing the picture elements in the image. The simple difference sum operation is carried out only for the sampled image signal components representing a few pairs of the picture elements, and a judgment is then made as to whether the image is symmetric or asymmetric. Therefore, the orientation, in which the object was placed when the image of the object was recorded, can be determined easily.

BRIEF DESCRIPTION OF THE DRAWINGS

FIG. 3A is an explanatory view showing a frontal radiation image of the cervical region of a human body, which image has been stored on a stimulable phosphor sheet, FIG. 3B is an explanatory view showing a lateral radiation image of the cervical region of a human body, which image has been stored on a stimulable phosphor sheet.

DESCRIPTION OF THE PREFERRED EMBODIMENTS

The present invention will hereinbelow be described in further detail with reference to the accompanying drawings.

Figure 1:
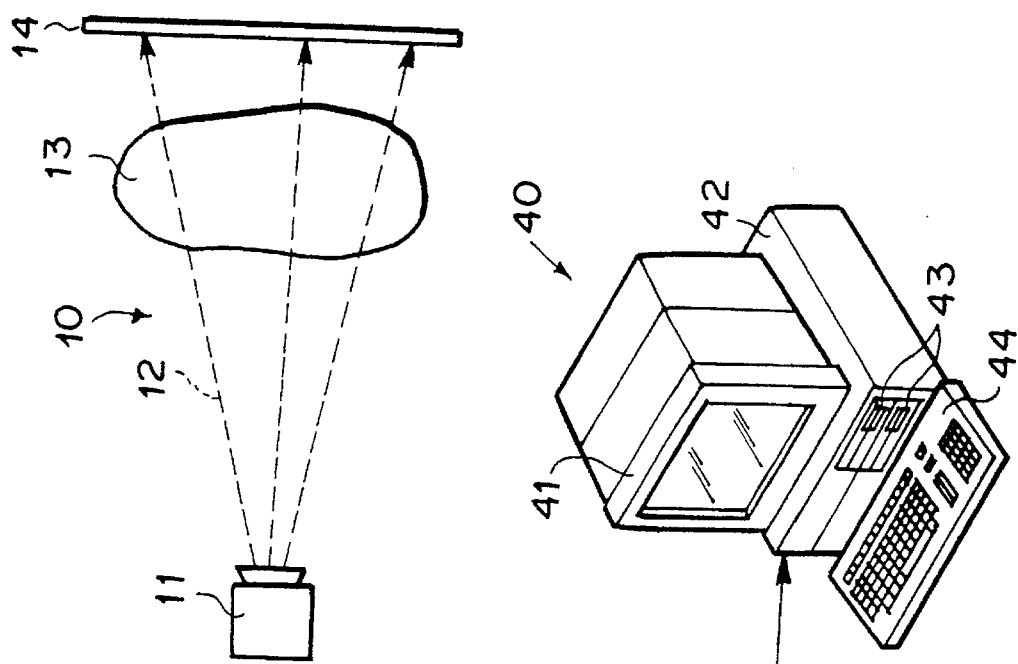
FIG. 1 is a schematic view showing an example of a radiation image recording apparatus.

FIG. 1 is a schematic view showing an example of a radiation image recording apparatus.

With reference to FIG. 1, radiation 12 is produced by a radiation source 11 of a radiation image recording apparatus and irradiated to an object 13. The object 13 is capable of taking either a symmetric orientation with respect to the center line serving as the axis of symmetry or an asymmetric orientation with respect to the center line. The radiation, which has passed through the object 13, impinges upon a stimulable phosphor sheet 14. In this manner, a radiation image of the object 13 is stored on the stimulable phosphor sheet 14.

Figure 2:
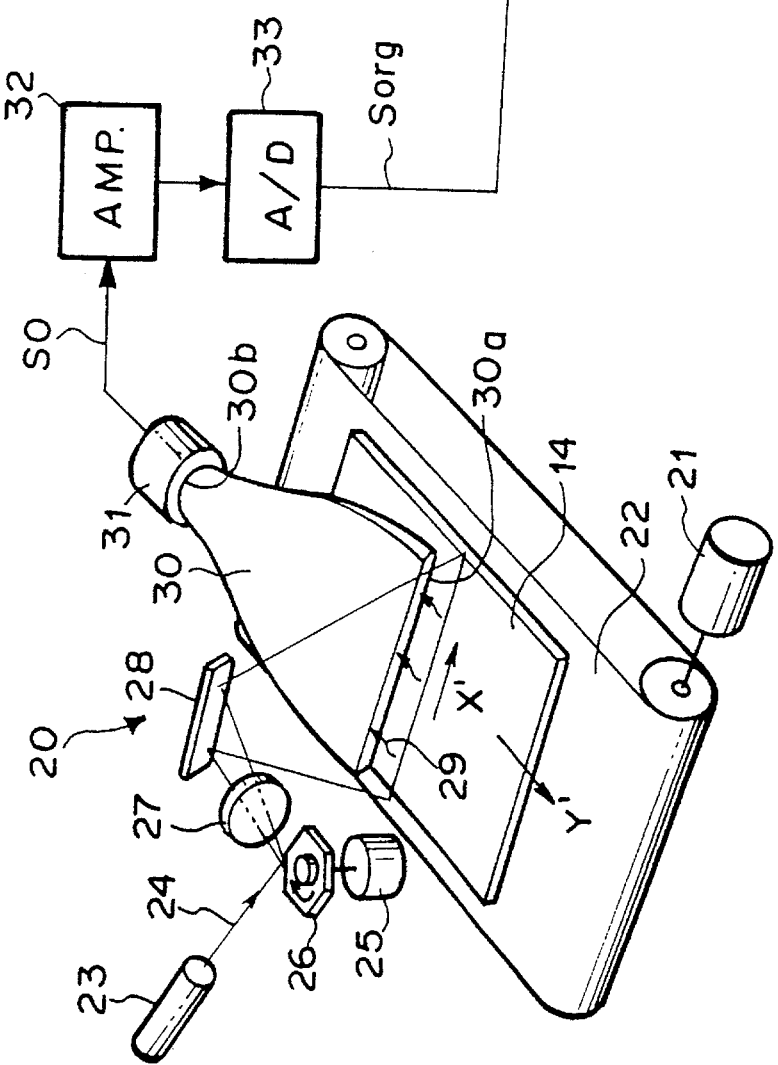
FIG. 2 is a perspective view showing an example of a radiation image read-out apparatus.

FIG. 2 is a perspective view showing an example of a radiation image read-out apparatus. FIG. 3A is an explanatory view showing a frontal radiation image of the object 13 (i.e., the cervical region of a human body in this case), which image has been stored on the stimulable phosphor sheet 14. FIG. 3B is an explanatory view showing a lateral radiation image of the object 13 (i.e., the cervical region of a human body in this case), which image has been stored on the stimulable phosphor sheet 14.

With reference to FIG. 2, a stimulable phosphor sheet 14, on which a radiation image has been stored in the radiation image recording apparatus shown in FIG. 1, is placed at a predetermined position in a read-out means 20.

The stimulable phosphor sheet 14 is then conveyed in a sub-scanning direction, which is indicated by the arrow Y, by an endless belt 22, which is operated by a motor 21. A laser beam 24, which serves as stimulating rays, is produced by a laser beam source 23. The laser beam 24 is reflected and deflected by a rotating polygon mirror 26, which is quickly rotated by a motor 25 in the direction indicated by the arrow. The laser beam 24 then passes through a converging lens 27, which may be constituted of an fθ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the radiation. The emitted light 29 is guided by a light guide member 30 and photoelectrically detected by a photomultiplier 31. The light guide member 30 is made from a light guiding material, such as an acrylic plate. The light guide member 30 has a linear light input face 30a, which is positioned so that it extends along the main scanning line on the stimulable phosphor sheet 14, and a ring-shaped light output face 30b, which is positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the radiation image, is converted into an electric signal by the photomultiplier 31.

An analog output signal S0 is generated by the photomultiplier 31. The analog output signal S0 is logarithmically amplified by a logarithmic amplifier 32, and digitized by an A/D converter 33. In this manner, an image signal Sorg is obtained. The image signal Sorg is then fed into an image processing means 40. The image processing means 40 is constituted of a CRT display device 41 which reproduces and displays a visible image, a main body 42 in which a CPU, an internal memory, an interface, or the like, are incorporated, a floppy disk drive unit 43 which operates a floppy disk, and a keyboard 44 from which necessary information is fed into the radiation image read-out apparatus.

The internal memory of the image processing means 40 is provided with an operational device, which carries out the operation described below. Specifically, image signal components representing, for example, six pairs of picture elements are sampled from the image signal Sorg. Each pair of the picture elements correspond symmetrically to each other with respect to the center line of the image. The absolute value $|S_i - S_{i'}|$ of the difference between the values of the pair of the sampled image signal components $S_i$ and $S_{i'}$ representing each pair of the picture elements is then calculated. Thereafter, the total sum $\Sigma |S_i - S_{i'}|$ of the absolute values $|S_i - S_{i'}|$ of the differences, which have been calculated for the six pairs of the image signal components $S_i$ and $S_{i'}$, is calculated. The calculated total sum $\Sigma |S_i - S_{i'}|$, is then compared with a predetermined threshold value K. In cases where the calculated total sum $\Sigma |S_i - S_{i'}|$ is larger than the threshold value K, it is judged that the image is a lateral object image, and second image processing conditions are selected for use in the image processing, which is to be carried out in the next step. In cases where the calculated total sum $\Sigma |S_i - S_{i'}|$ is not larger than the threshold value K, it is judged that the image is a frontal object image, and first image processing conditions are selected for use in the image processing, which is to be carried out in the next step.

Figure 4:
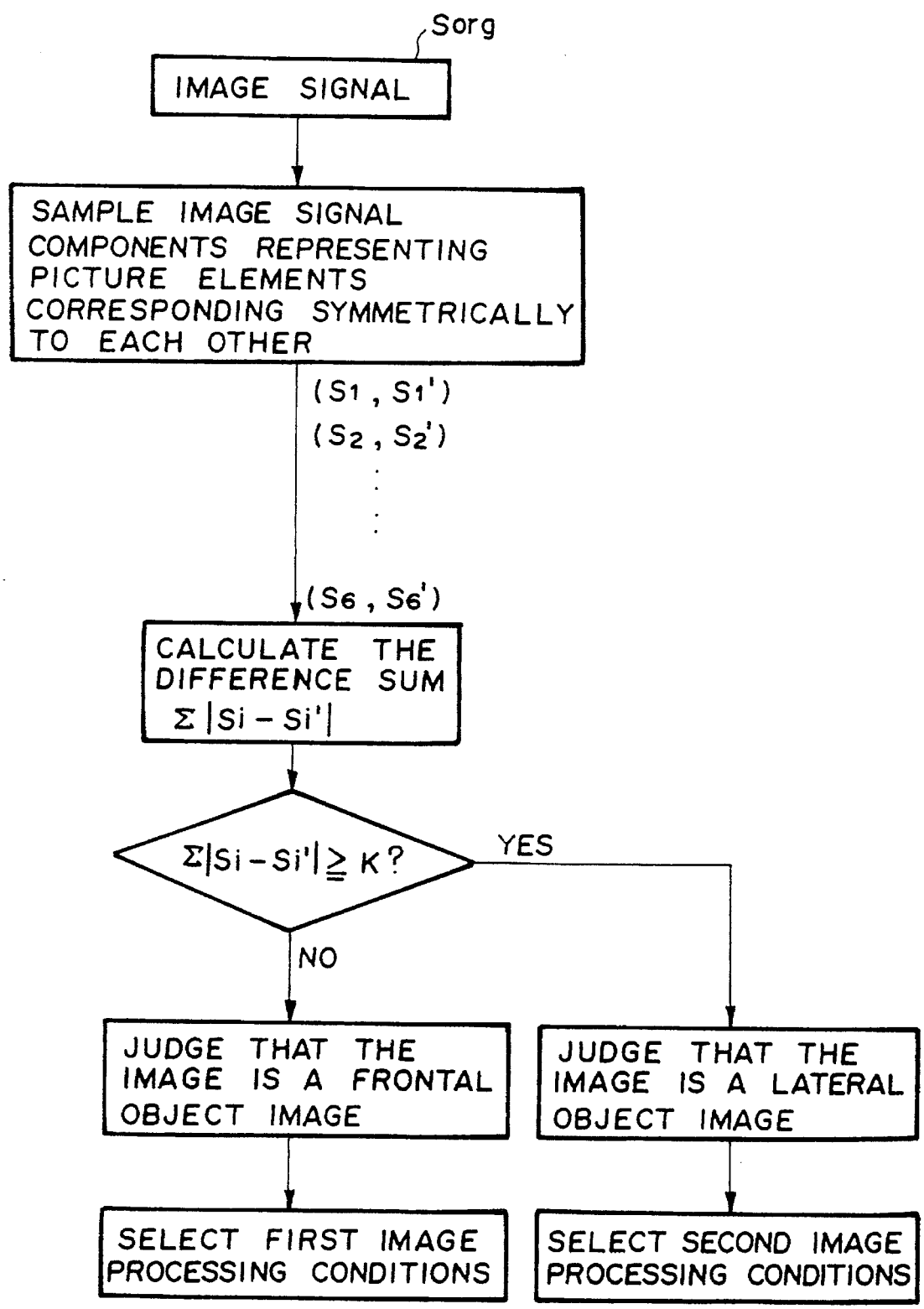
FIG. 4 is a flow chart showing the operations of an operational device.

FIG. 4 is a flow chart showing the operations of the operational device of the internal memory.

The operations of the operational device will hereinbelow be described in more detail with reference to FIGS. 3A and 3B and FIG. 4. The image signal Sorg is fed into the image processing means 40. Six pairs of image signal components $(S_1, S_{1'})$, $(S_2, S_{2'})$, . . . , $(S_6, S_{6'})$ representing six pairs of picture elements are then sampled from the image signal Sorg. Each pair of the picture elements correspond symmetrically to each other with respect to the center line of the image. Table 1 below lists the characteristics of the image portions represented by the pairs of the sampled image signal components $(S_1, S_{1'})$, $(S_2, S_{2'})$, . . . , $(S_6, S_{6'})$.

TABLE 1

| | Frontal object image (FIG. 3A) | | Lateral object image (FIG. 3B) | |
|---|---|---|---|---|
| i | $S_i$ | $S_{i'}$ | $S_i$ | $S_{i'}$ |
| 1 | Soft tissue pattern | Soft tissue pattern | Background region | Bone pattern |
| 2 | Bone pattern | Bone pattern | Bone pattern | Bone pattern |
| 3 | Background region | Background region | Background region | Background region |
| 4 | Soft tissue pattern | Soft tissue pattern | Bone pattern | Bone pattern |
| 5 | Soft tissue pattern | Soft tissue pattern | Background region | Soft tissue pattern |
| 6 | Bone pattern | Bone pattern | Soft tissue pattern | Bone pattern |

The number of the pairs of the sampled image signal components is not limited to six, but may be one, two, . . .

, ten, and so on. However, in order that the accuracy, with which the object orientation is determined, can be kept high, a slightly large number of pairs of image signal components should preferably be sampled. Also, the image processing means 40 may be constructed such that an arbitrary number of pairs of image signal components can be selected from the keyboard 44 by the operator. Further, the image processing means 40 may be constructed such that the image signal components representing the picture elements, which are located at arbitrary image portions, can be sampled.

Thereafter, the absolute value $|S_1-S_{1'}|$ of the difference between the values of the pair of the sampled image signal components $(S_1, S_{1'})$ representing the pair of the picture elements is then calculated. Also, in the same manner, the absolute values $|S_2-S_{2'}|, \ldots, |S_6-S_{6'}|$ of the differences between the values of the pairs of the sampled image signal components $(S_2 S_{2'}), \ldots, (S_6 S_{6'})$ representing the pairs of the picture elements are calculated. As shown in Table 1, in cases where the image is approximately symmetric with respect to the center line of the image, i.e. in the case of the frontal image of the cervical region shown in FIG. 3A, both of the paired picture elements lie in the region inside of the bone pattern, or in the region inside of the soft tissue pattern, or in the background region. Therefore, each pair of the image signal components take approximately identical values. In cases where the image is asymmetric with respect to the center line of the image, i.e. in the case of the lateral image of the cervical region shown in FIG. 3B, it often occurs that one of the paired picture elements lies in the region inside of the bone pattern, and the other picture element lies in the region inside of the soft tissue pattern. Also, it often occurs that one of the paired picture elements lies in the region inside of the bone pattern, and the other picture element lies in the background region. Also, it often occurs that one of the paired picture elements lies in the region inside of the soft tissue pattern, and the other picture element lies in the background region. Therefore, in such cases, each pair of the image signal components take different values, and the difference between the values of each pair of the image signal components takes a value far apart from zero.

Thereafter, the absolute values of the differences, which have been calculated for the six pairs of the image signal components, are added together, and the total sum $\Sigma|S_i-S_{i'}|$ of the absolute values $|S_i S_{i'}|$ is thereby calculated. The calculated total sum $\Sigma|S_i-S_{i'}|$ is then compared with the predetermined threshold value K.

As described above, in cases where the image is symmetric with respect to the center line of the image, the calculated total sum $\Sigma|S_i S_{i'}|$ takes a value, which is close to zero and is smaller than the threshold value K. In cases where the image is asymmetric with respect to the center line of the image, the calculated total sum $\Sigma|S_i-S_{i'}|$ takes a value, which is sufficiently larger than zero and is larger than the threshold value K.

Therefore, in cases where the calculated total sum $\Sigma|S_i-S_{i'}|$ is not larger than the threshold value K, it is judged that the image is a frontal object image. In cases where the calculated total sum $\Sigma|S_i-S_{i'}|$ is larger than the threshold value K, it is judged that the image is a lateral object image.

In cases where it has been judged that the image, which has been stored on the stimulable phosphor sheet, is a frontal object image, the first image processing conditions, which are suitable for the frontal object image, are selected for use in the image processing, which is to be carried out in the next step. In cases where it has been judged that the image, which has been stored on the stimulable phosphor sheet, is a lateral object image, the second image processing conditions, which are suitable for the lateral object image, are selected for use in the image processing, which is to be carried out in the next step. The image processing is then carried out under the selected image processing conditions.

The image signal, which has been obtained from the image processing, is fed into an image reproducing apparatus (not shown) and used for the reproduction of a visible radiation image.

Therefore, with this embodiment of the method for determining an object orientation from a recorded image in accordance with the present invention, calculations need not be carried out for all of the image signal components representing the picture elements in the image. The simple difference sum operation is carried out only for the sampled image signal components representing a few pairs of the picture elements, and a judgment is then made as to whether the image is symmetric or asymmetric. Therefore, the orientation, in which the object was placed when the image of the object was recorded, can be determined easily.

In this embodiment, the absolute value $|S_i-S_{i'}|$ of the difference between the values of the pair of the sampled image signal components $S_i$ and $S_{i'}$, representing each pair of the picture elements is calculated. Thereafter, the total sum $\Sigma|S_i-S_{i'}|$ of the absolute values $|S_i-S_{i'}|$ of the differences, which have been calculated for all pairs of the image signal components $S_i$ and $S_{i'}$ is calculated and utilized. Alternatively, such that the difference between a symmetric image and an asymmetric image may be represented more markedly, the total sum $\Sigma(S_i-S_{i'})^2$ of the square values $(S_i-S_{i'})^2$ of the differences $(S_i-S_{i'})$ may be utilized.

As another alternative, the values of the image signal components representing the picture elements in the image may be compared with a predetermined threshold value L. The image signal components may thus be binarized in accordance with whether the values of the image signal components are or are not larger than the threshold value L. Thereafter, the aforesaid differences and the absolute values of the differences may be calculated. In this manner, even if the number of the pairs of the sampled image signal components is large, the operation can be simplified, and the time required for the determination of the object orientation can be kept short.

Also, with the method for determining an object orientation from a recorded image in accordance with the present invention, the orientation, in which the object was placed when the image of the object was recorded, can be determined automatically from the recorded image. Therefore, even if a different mode of image processing is to be employed in accordance with whether the image is symmetric or asymmetric with respect to the center line of the image, the change-over of the mode of the image processing can be carried out automatically in accordance with the results of the determination of the object orientation.

In this embodiment, the method for determining an object orientation from a recorded image in accordance with the present invention is employed in the system of the so-called "computed radiography" (CR), in which the image is read out with the radiation image read-out apparatus from the stimulable phosphor sheet carrying the image stored thereon. The method for determining an object orientation from a recorded image in accordance with the present invention is also applicable when an image is read out as an image signal from other types of recording media, such as photographic film, on which the image has been recorded, and when an image has been recorded as an image signal.

What is claimed is:

1. A method for determining an orientation from a recorded image of a physical object, wherein the orientation, in which the physical object was placed when the image of the physical object was recorded, is determined, the method comprising the steps of:

i) retrieving an image signal of the physical object which is stored on an image storing means, the image represented by said image signal being capable of taking either a symmetric orientation or an asymmetric orientation with respect to a center line of the image serving as the axis of symmetry, said image signal being made up of a series of image signal components representing picture elements in the image, ii) sending the retrieved image signal to an image processing means, iii) calculating, using said image processing means, the difference between values of image signal components representing at least a single pair of picture elements, which correspond symmetrically to each other with respect to the center line of the image, and calculating a characteristic value, which represents symmetry or asymmetry of the image, from the value of said difference by carrying out a predetermined operation, and iv) using said image processing means for making a judgment from the level of said characteristic value as to determine whether the image of the object represents a symmetric orientation or an asymmetric orientation.

2. A method as defined in claim 1 wherein the predetermined operation comprises the steps of:

calculating the absolute value of the difference between the values of the image signal components representing each pair of the picture elements, which correspond symmetrically to each other, thereafter calculating the total sum of the absolute values of the differences, which have been calculated for the respective pairs of the picture elements corresponding symmetrically to each other, and taking said total sum as said characteristic value.

3. A method as defined in claim 1 wherein the predetermined operation comprises the steps of:

calculating the difference between the values of the image signal components representing each pair of the picture elements, which correspond symmetrically to each other, thereafter calculating the total sum of square values of the differences, which have been calculated for the respective pairs of the picture elements corresponding symmetrically to each other, and taking said total sum as said characteristic value.

4. A method as defined in any one of claims 1, 2, or 3 wherein the values of the image signal components representing the picture elements in the image are binarized with a predetermined threshold value, and thereafter the predetermined operation is carried out on the binary values which have thus been obtained.

5. A method as defined in claim 1 wherein the image is a radiation image.

6. A method as defined in claim 5, wherein said image storing means is a stimulable phosphor sheet.

7. A method as defined in claim 6 wherein an image signal, which represents the radiation image and serves as said image signal, is detected by exposing the stimulable phosphor sheet to stimulating rays, which cause the stimulable phosphor sheet to emit light in proportion to the amount of energy stored thereon during its exposure to radiation, and photoelectrically detecting the emitted light.

8. A method as defined in claim 7 wherein said stimulating rays are a laser beam.

9. A method as defined in claim 1, wherein said image storing means is a photographic film.

10. A method as defined in claim 1, wherein the image processing means is a digital computer.

11. An apparatus for determining an object orientation from a recorded image, wherein the orientation, in which the object was placed when the image of the object was recorded, is determined, the apparatus comprising:

i) means for obtaining an image signal, which represents the image capable of taking either a symmetric orientation or an asymmetric orientation with respect to a center line of the image serving as the axis of symmetry, said image signal being made up of a series of image signal components representing picture elements in the image, ii) means for calculating the difference between values of image signal components representing at least a single pair of picture elements, which correspond symmetrically to each other with respect to the center line of the image, and for calculating a characteristic value, which represents symmetry or asymmetry of the image, from the value of said difference by carrying out a predetermined operation, and iii) means for making a judgment from the level of said characteristic value as to whether the image is a symmetric image or is an asymmetric image.

12. An apparatus as defined in claim 11, wherein the image is a radiation image.

13. An apparatus as defined in claim 12, wherein the radiation has been stored on a stimulable phosphor sheet.

14. An apparatus as defined in claim 13, wherein an image signal, which represents the radiation image and serves as an image signal, is detected by exposing the stimulable phosphor sheet to stimulating rays, which cause the stimulable phosphor sheet to emit light in proportion to the amount of energy stored thereon during its exposure to radiation, and photoelectrically detecting the emitted light.

15. An apparatus as defined in claim 14, wherein said stimulating rays are a laser beam.

16. An apparatus as defined in claim 11, wherein the image has been recorded on photographic film.

17. An apparatus as defined in claim 11, wherein the image processing means is a digital computer.

18. A method for determining an orientation from a recorded image of a physical object, wherein the orientation, in which the physical object was placed when the image of the physical object was recorded, is determined, the method comprising the steps of:

i) obtaining an image signal of the physical object using an image readout means, said image signal representing the image capable of taking either a symmetric orientation or an asymmetric orientation with respect to a center line of the image serving as the axis of symmetry, said image signal being made up of a series of image signal components representing picture elements in the image, ii) sending the obtained image signal to an image processing means, iii) calculating, using said image processing means, the difference between values of image signal components representing at least a single pair of picture elements, which correspond symmetrically to each other with respect to the center line of the image, and calculating a characteristic value, which represents symmetry or asymmetry of the image, from the value of said difference by carrying out a predetermined operation, and iv) using said image processing means for making a judgment from the level of said characteristic value as to determine whether the image of the object represents a symmetric orientation or an asymmetric orientation.

19. A method as defined in claim 18, wherein the image processing means is a digital computer.

* * * * *